(12) United States Patent
Asano et al.

(10) Patent No.: US 8,627,717 B2
(45) Date of Patent: Jan. 14, 2014

(54) THERMAL FLOW SENSOR

(75) Inventors: Satoshi Asano, Hitachi (JP); Masahiro Matsumoto, Hitachi (JP); Hiroshi Nakano, Tokai (JP); Keiji Hanzawa, Mito (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 74 days.

(21) Appl. No.: 13/361,372

(22) Filed: Jan. 30, 2012

(65) Prior Publication Data
US 2012/0192644 A1 Aug. 2, 2012

(30) Foreign Application Priority Data
Jan. 31, 2011 (JP) ................... 2011-017384

(51) Int. Cl.
G01F 1/68 (2006.01)

(52) U.S. Cl.
USPC ........................................ 73/204.26

(58) Field of Classification Search
USPC ............... 73/204.26, 204.23, 519.09
See application file for complete search history.

(56) References Cited

U.S. PATENT DOCUMENTS

| | | | | |
|---|---|---|---|---|
| 4,888,988 A | * | 12/1989 | Lee et al. | 73/204.26 |
| 5,763,775 A | * | 6/1998 | Sato et al. | 73/204.26 |
| 7,752,910 B2 | * | 7/2010 | Wang et al. | 73/204.26 |
| 7,856,879 B2 | * | 12/2010 | Cai | 73/514.09 |
| 8,286,478 B2 | * | 10/2012 | Speldrich | 73/204.23 |

FOREIGN PATENT DOCUMENTS

| | | |
|---|---|---|
| JP | 62-813 A | 1/1987 |
| JP | 64-14588 U | 1/1989 |
| JP | 2002-107298 A | 4/2002 |
| JP | 2009-97925 A | 5/2009 |

OTHER PUBLICATIONS

Japanese Office Action Dated Apr. 16, 2013 {Three (3) Pages}.
Japanese Office Action Dated Jul. 2, 2013 {Three (3) Pages}.

* cited by examiner

*Primary Examiner* — Jewel V Thompson
(74) *Attorney, Agent, or Firm* — Crowell & Moring LLP

(57) ABSTRACT

A thermal flow sensor includes a heater temperature controller that realizes stable startup characteristics and prevents degradation of a sensor element and can also accommodate a smaller heater. The sensor also includes a semiconductor substrate; a cavity portion provided in the semiconductor substrate; a dielectric film provided on the semiconductor substrate; a thin layer area formed as a result of the dielectric film covering the cavity portion; a heating resistor provided in the thin layer area on the dielectric film; a first temperature-sensitive resistor provided in the thin layer area on the dielectric film; a heating controller; a second temperature-sensitive resistor provided near the heating resistor; and a flow rate detector that detects a flow rate of a fluid on the basis of temperature of the second temperature-sensitive resistor. The heating controller controls the temperature of the heating resistor on the basis of first and second reference temperatures.

12 Claims, 12 Drawing Sheets

THERMAL FLOW SENSOR

BACKGROUND OF THE INVENTION

1. Field of the Invention

The present invention relates to a thermal flow sensor that causes a heating resistor to generate heat to measure a rate of a fluid flowing around the heating resistor, and in particular, to a thermal flow sensor including a heating controller for controlling an amount of heat generated by a heating resistor.

2. Background Art

As airflow sensors that detect intake air flows of internal combustion engines in automobiles or the like, thermal airflow sensors that can directly measure mass flow rates are generally used.

In recent years, a thermal flow sensor has been proposed in which a sensor element of the thermal flow sensor is produced on a semiconductor substrate such as silicon (Si) using a MEMS (Micro Electro Mechanical Systems) technology. Such a semiconductor sensor element has a cavity portion created by cutting a part of a semiconductor substrate in a rectangular shape, and a heating resistor (hereinafter, referred to as the "heater") is formed on a dielectric film of several microns thick on the cavity portion.

In such a sensor element, a temperature-sensitive resistor (hereinafter, referred to as the "detection resistor") is formed near a heater, and a flow rate is detected on the basis of the amount of heat transferred from a fluid flowing over the heater to the detection resistor. Therefore, the temperature difference between the heater and the ambient temperature needs to be constant. As a way to control a heater temperature, an indirect heat control scheme is known in which a temperature-sensitive resistor for monitoring a heater temperature (hereinafter, referred to as the "indirect heat resistor") is formed near a heater, and a heater driving power is feedback-controlled so that a resistance value of the indirect heat resistor has a desired value.

A heater, a detection resistor, and an indirect heat resistor such as those described above are small in size, for example, several dozen to several hundred microns, and since they are formed on a thin layer of several microns thick, they have small heat capacities and are quick in response. Thus, delay in feedback control response or delay in heat transfer between a heater and an indirect heat resistor may prevent heater temperature from being appropriately controlled at the time of startup. A conventional art to solve the problem has been described in JP Patent Application Publication No. 2009-097925 A.

A thermal flow sensor described in JP Patent Application Publication No. 2009-097925 A inputs voltage signals, which vary depending on a temperature of an indirect heat resistor, to an up-down counter via a comparator. Output of the up-down counter is converted into electric power via a digital/analog converter (hereinafter, the D/A converter) and a transistor for driving a heater, and supplied to the heater. In addition, at power-on, an initial value of the up-down counter is set at a reference value (preferably, a maximum output indication value of the D/A converter) and the up-down counter is operated with a faster clock signal, whereby the amount of heat generated by the heater can be quickly controlled.

SUMMARY OF THE INVENTION

However, in the conventional art, variations in heat capacities of heaters and indirect heat resistors substantially affect startup characteristics. For example, in semiconductor sensor elements, variations occur in heat capacities of heaters and indirect heat resistors. Since a heat response obtained when a predetermined driving power is applied to a heater at the time of startup varies depending on a heat capacity, variations may occur in transient, and for example, increase in transient may cause a longer startup time. Additionally, increase in temperature transient may promote degradation of the sensor element. The conventional art has not sufficiently addressed these respects.

To address these problems, it is conceivable to adjust a rate of processing, namely, a clock period, but an increased number of adjusting steps may increase the costs. Also, it is conceivable to restrict variations in heat capacities by increasing the sizes of heaters and indirect heat resistors, but power consumption would be increased.

The present invention has been made in view of the foregoing problems, and an object of the invention is to provide a thermal flow sensor including a heater temperature controller that realizes stable startup characteristics and preventing degradation of a sensor element and can also accommodate a smaller heater.

To this end, a thermal flow sensor of the present invention comprises: a semiconductor substrate; a cavity portion provided in the semiconductor substrate; a dielectric film provided on the semiconductor substrate so as to cover the cavity portion; a thin layer area formed as a result of the dielectric film covering the cavity portion; a heating resistor provided in the thin layer area on the dielectric film; a first temperature-sensitive resistor provided in the thin layer area on the dielectric film, a resistance value of the first temperature-sensitive resistor varying depending upon temperature; a heating controller that controls temperature of the heating resistor on the basis of temperature of the first temperature-sensitive resistor; a second temperature-sensitive resistor provided near the heating resistor, a resistance value of the second temperature-sensitive resistor varying depending upon temperature; and a flow rate detector that detects a flow rate of a fluid on the basis of temperature of the second temperature-sensitive resistor. The heating controller controls the temperature of the heating resistor on the basis of a first reference temperature, which is a target temperature of the first temperature-sensitive resistor, and a second reference temperature, which is an escape temperature of the first temperature-sensitive resistor.

According to the present invention, there is provided a thermal flow sensor including a heater temperature controller that realizes stable startup characteristics and preventing degradation of a sensor element and can also accommodate a smaller heater.

Figure 1:
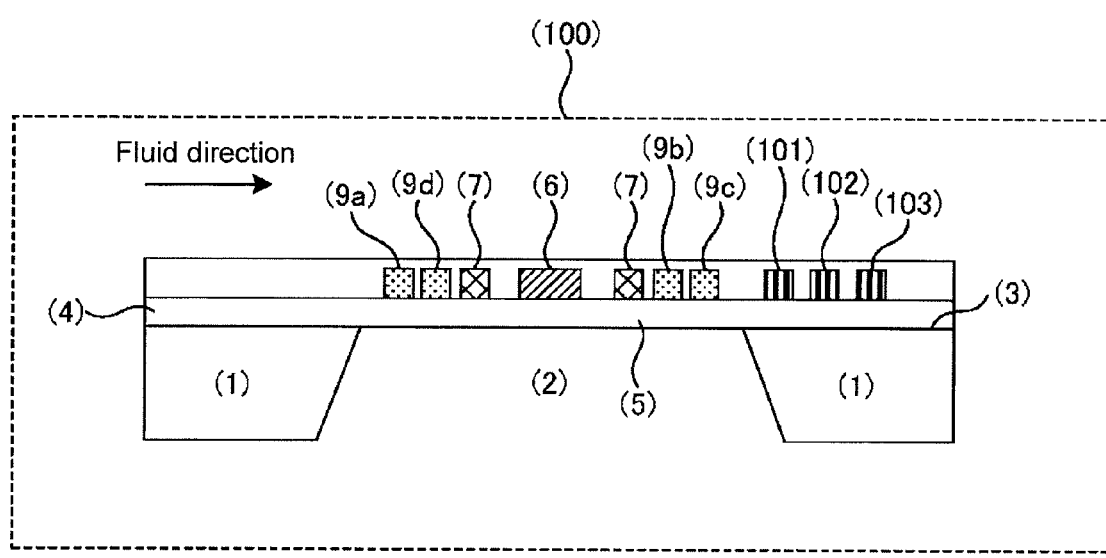
FIG. 1 illustrates a schematic cross-sectional view of a sensor element according to a first embodiment.

DESCRIPTION OF SYMBOLS 1 semiconductor substrate
2 cavity portion
3 surface of semiconductor substrate
4 dielectric film
5 thin layer area
6 heater
7 indirect heat resistor
8 heating control circuit
9 detection resistor
10 flow rate detecting circuit
11 first temperature control circuit
12 second temperature control circuit
13 feedback control circuit
14, 21 comparators
15 limit unit
16 switching element
17 clamp element
18 load resistor
19 resistor switch
20 accelerator
22 DSP
23 frequency divider
24 clock switch
25 constant selecting switch
26, 204 memory elements
27 program selecting switch
100 sensor element
101 to 103 fixed resistors
200 processing circuit
201 D/A converter
202 transistor element
203 oscillator
301 to 305 electrodes
401 proportional gain
402 integrator gain
403 integrator
404 adder

DETAILED DESCRIPTION OF THE PREFERRED EMBODIMENTS

Now, embodiments of the present invention will be described with reference to the drawings.

First Embodiment 1

A first embodiment of the present invention will be described with reference to FIGS. 1 and 2.

Figure 2:
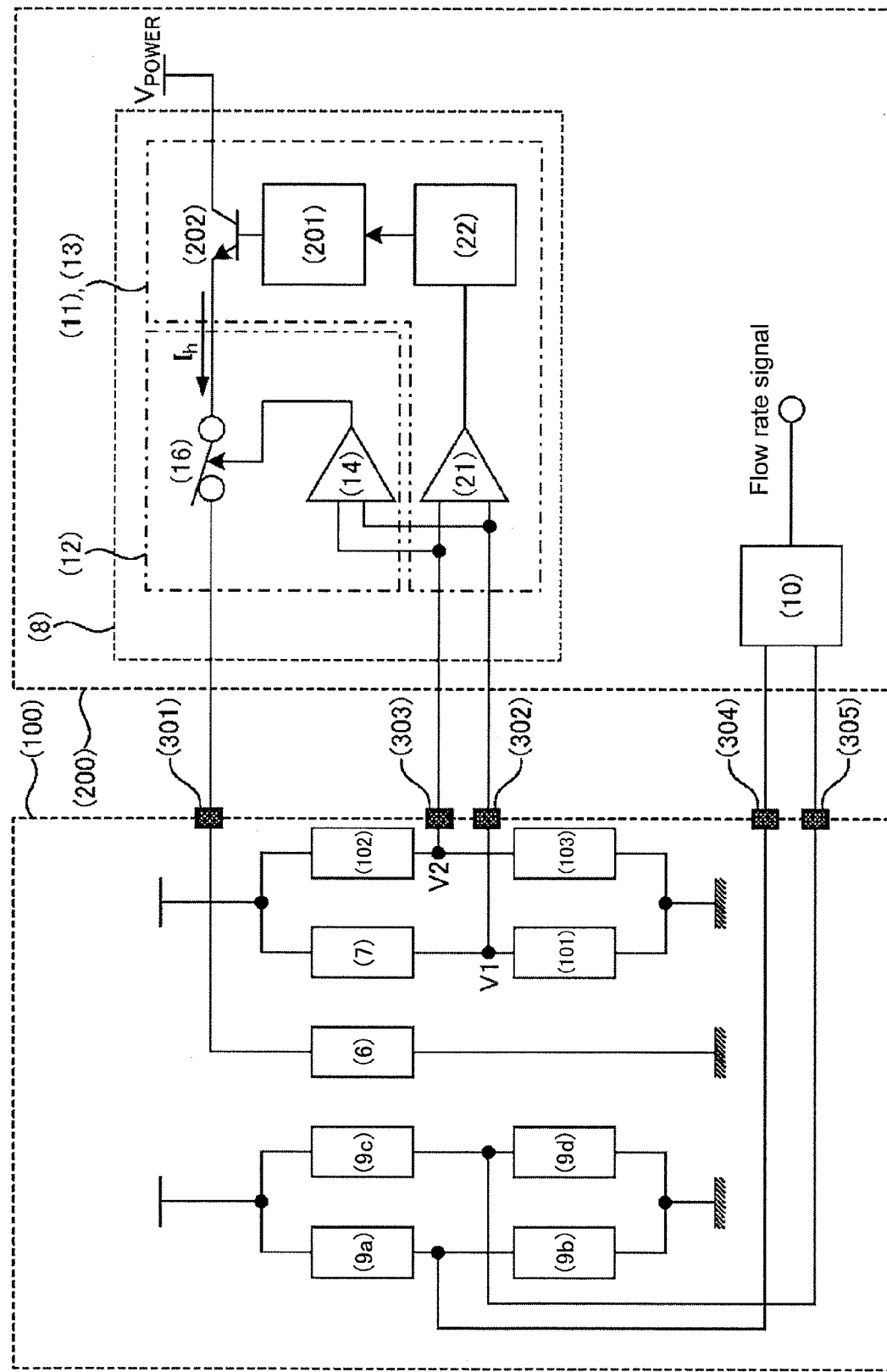
FIG. 2 illustrates a circuit configuration of a thermal flow sensor according to the first embodiment.

FIG. 1 illustrates a schematic cross-sectional view of a sensor element according to the first embodiment. FIG. 2 illustrates a circuit configuration of a thermal flow sensor according to the first embodiment.

A configuration of the thermal flow sensor of the first embodiment will be described.

The thermal flow sensor of the first embodiment includes a sensor element (100) and a processing circuit (200).

In the sensor element (100), a dielectric film (4) is formed as a result of depositing oxides on a surface (3) of a semiconductor substrate (1) made of a material with high thermal conductivity such as silicon (Si) and ceramics, and the other side surface of the semiconductor substrate (1) is subjected etching to provide a cavity portion (2). In addition, a thin layer area (5) on the cavity portion (2) has thereon a heater (6), an indirect heat resistor (7), and detection resistors (9a) to (9d) that are made from resistance materials with a high temperature coefficient of resistance (hereinafter, referred to as the "TCR"), such as polycrystalline silicon (Si), platinum (Pt), and molybdenum (Mo). Moreover, fixed resistors (101) to (103) are formed on an area of the dielectric film (4) other than the thin layer area (5). It should be noted that although it is assumed that all of the resistance values of the fixed resistors (101) to (103) are equal for simplicity, the values may be different from each other.

The processing circuit (200) includes a heating control circuit (8) that controls an amount of heat generated by the heater (6) and a flow rate detecting circuit (10) that detects a flow rate of a fluid on the heater (6).

The heating control circuit (8) includes a first temperature control circuit (11) that brings the temperature of the indirect heat resistor (7) close to a first reference temperature, which is a target temperature, and a second temperature control circuit (12) that holds the temperature of the indirect heat resistor (7) at a temperature equal to or lower than a second reference temperature that is higher than the first reference temperature and an escape temperature of the indirect heat resistor (7).

The first temperature control circuit (11) includes a comparator (21), a digital signal processor (hereinafter, the DSP) (22), a D/A converter (201), and a transistor element (202).

The second temperature control circuit (12) includes a comparator (14) and a switching element (16).

Further, the sensor element (100) is provided with electrodes (301) to (305) and is electrically connected to the processing circuit (200). In the sensor element (100), the heater (6) is connected with the electrode (301) and a reference potential. In addition, the indirect heat resistor (7) and the fixed resistors (101) to (103) form a bridge circuit; a midpoint potential (V1) between the indirect heat resistor (7) and the fixed resistor (101) is connected to the electrode (302), and a midpoint potential (V2) between the fixed resistor (102) and the fixed resistor (103) is connected to the electrode (303). Also, the detection resistors (9a) to (9d) form a bridge circuit; a midpoint potential between the detection resistor (9a) and the detection resistor (9b) is connected to the electrode (304), and a midpoint potential between the detection resistor (9c) and the detection resistor (9d) is connected to the electrode (305). The flow rate detecting circuit (10) determines a flow rate on the basis of signals output from the electrodes (304) and (305).

Next, an operation of the thermal flow sensor of the first embodiment will be described.

It should be noted that hereinafter, a state in which the startup of the thermal flow sensor is completed, that is, the temperature of the heater (6) has converged and flow rates are detected is referred to as the "steady state." Also, a state during startup, that is, a state in which a control system is transient is referred to as the "transient state."

In the steady state, because the transistor element (202) is in an ON state depending on the output of the D/A converter (201), a driving current (Ih) is input to the sensor element (100) via the switching element (16) and the electrode (301).

The driving current (Ih) causes the heater (6) to generate Joule's heat that transfers to the indirect heat resistor (7) via the dielectric film (4) and a fluid. Because of increased temperature of the indirect heat resistor (7), its resistance value is increased and a potential at the midpoint potential (V1) is lowered. It should be noted that since the fixed resistors (101) to (103) are not in the thin layer area (2), the transferred heat is absorbed in the semiconductor substrate (1), so that temperature does not vary. Therefore, the midpoint potential (V2) remains unchanged.

Then, the midpoint potentials (V1) and (V2) are input to the comparator (21) via the electrodes (302) and (303). The comparator (21) compares the midpoint potentials (V1) and (V2) and inputs a result of the comparison to the DSP (22). The DSP (22) calculates a driving power indication value for equalizing the midpoint potentials (V1) and (V2), and outputs the value to the subsequent D/A converter (201). Then, in response to the driving power indication value input to the D/A converter (201), a base voltage of the transistor element (202) varies and the driving current (Ih) also varies. Such feedback control maintains the temperature of the heater (6) constant.

Figure 8:
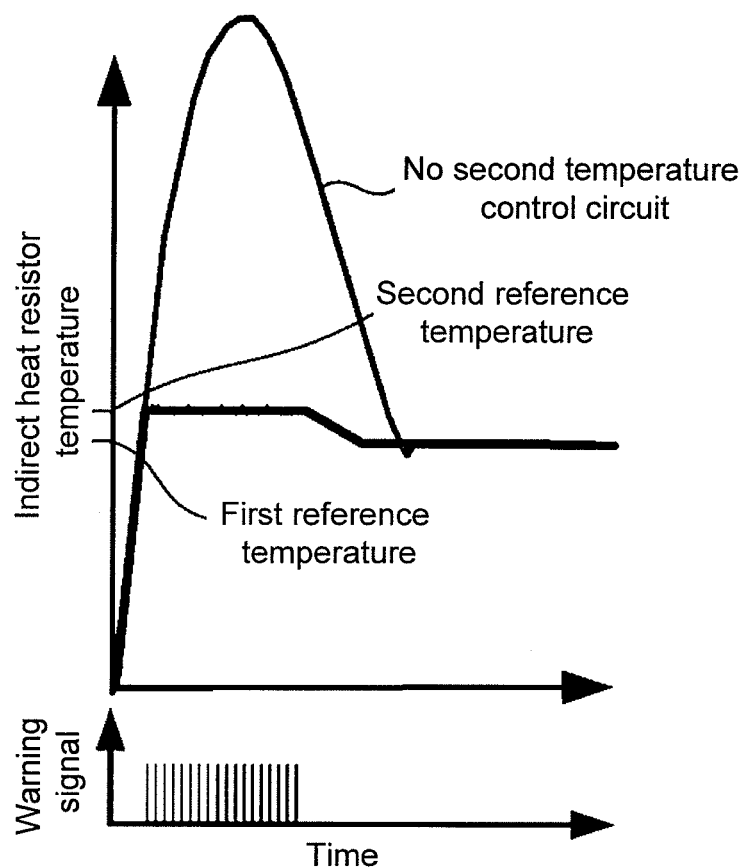
FIG. 8 illustrates changes in temperature of the indirect heat resistor at the time of startup.
Figure 9:
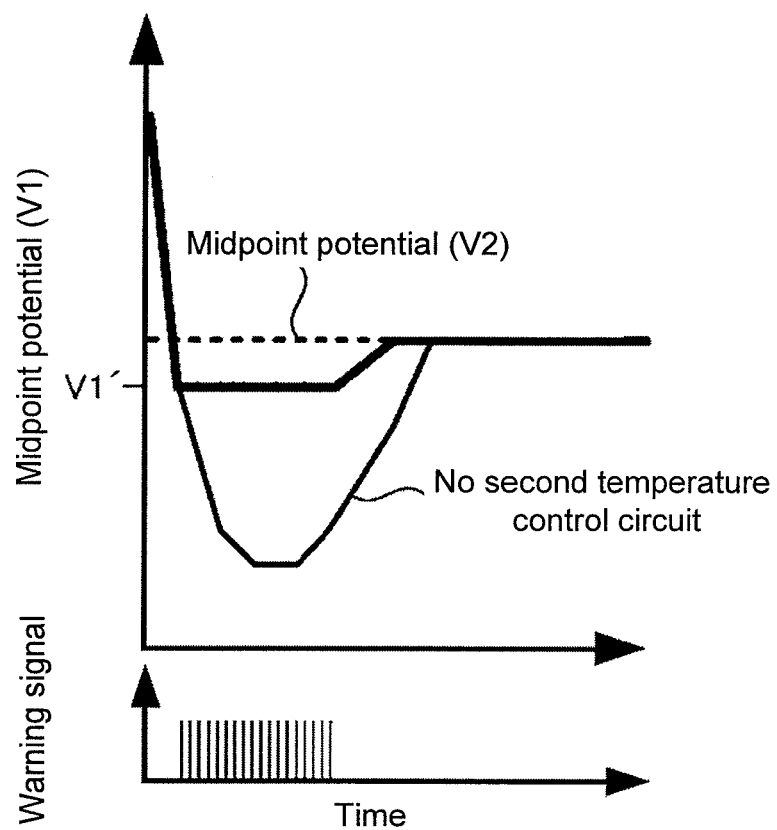
FIG. 9 illustrates changes in a midpoint potential V1 at the time of startup.
Figure 10:
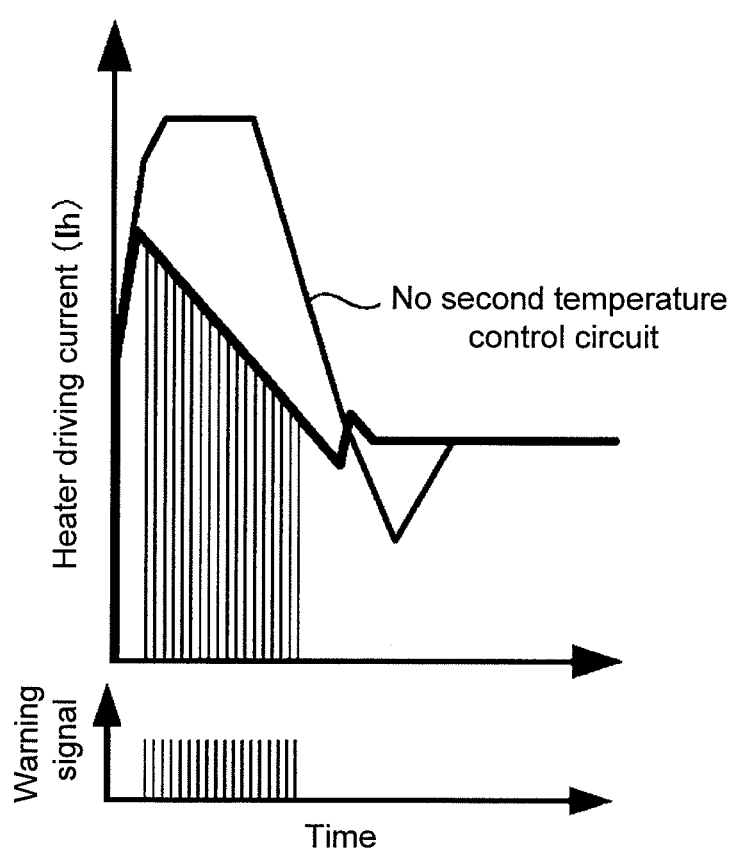
FIG. 10 illustrates changes in a driving current applied to a heater at the time of startup.

Next, an operation in the transient state will be described with reference to FIGS. 8 to 11. FIG. 8 illustrates changes in temperature of the indirect heat resistor (7) at the time of startup. FIG. 9 illustrates changes in the midpoint potential (V1) at the time of startup. FIG. 10 illustrates changes in a driving current applied to the heater (6) at the time of startup.

In addition, FIGS. 8 to 10 also illustrate characteristics obtained if a second temperature control circuit is not included.

At the time of startup, since the heater (6), the indirect heat resistor (7), and the detection resistors (9a) to (9d) have the same temperature, the midpoint potential (V1) is higher than the (V2) in potential. At the time of startup, because the output of the DSP (22) is an initial or an undefined value, the strength of the driving current (Ih) supplied from the transistor element (202) is arbitrary. A heat capacity of the heater (6) of the semiconductor is minute, so that any current value causes the heater (6) to generate heat. In the indirect heat resistor (7) which has received the heat of the heater (6), a resistance value increases and the midpoint potential (V1) lowers.

Then, when a certain time has passed, the temperature of the indirect heat resistor (7) becomes greater than the first reference temperature and approaches the second reference temperature. At the same time, the midpoint potential (V1) becomes lower than the (V2) in potential and reaches a potential (V1') corresponding to the second reference temperature. An operation of the second temperature control circuit (12) in this state will be described.

In the second temperature control circuit (12), the comparator (14) detects, from a potential difference between the (V1) and the (V2), the fact that the midpoint potential (V1) has reached the (V1') and inverts the output of the comparator (14) to output warning signals. Upon receiving the warning signals, the switching element (16) disconnects the transistor element (202) from the heater (6). In this state, because currents do not flow through the heater (6), an amount of heat generation is decreased. At the same time, because the temperature of the indirect heat resistor (7) is also lowered, the midpoint potential (V1) approaches the (V2). Then, the comparator (14) cancels the warning signals. Accordingly, the switching element (16) enters a connected state again, the temperature of the indirect heat resistor (7) increases again, and the midpoint potential (V1) approaches the (V1') again.

While the second temperature control circuit (12) is repeating the foregoing operation, the DSP (22) leaves the transient state and outputs an appropriate control amount. Then, even if the switching element (16) is in the connected state, the temperature of the indirect heat resistor (7) does not approach the second reference temperature and then is stabilized at the first reference temperature by a function of the first temperature control circuit (11). Thereafter, the flow rate detecting circuit (10) detects an accurate flow rate on the basis of the voltage signals of the electrodes (304) and (305).

Figure 11:
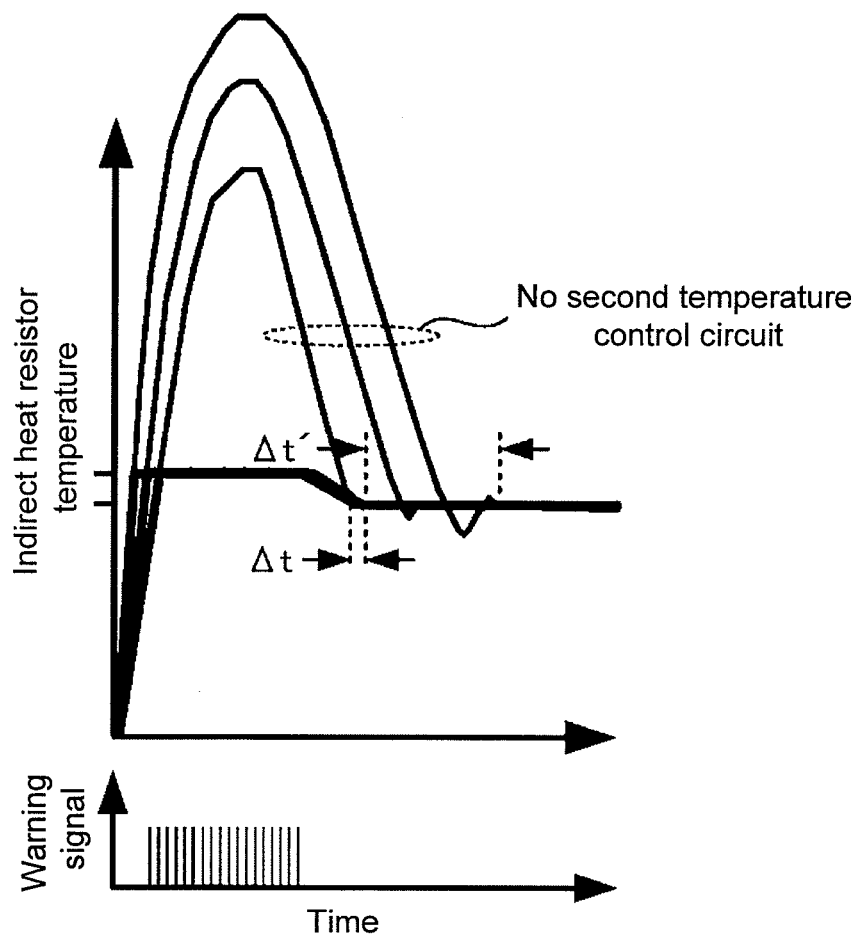
FIG. 11 illustrates variations in characteristics at the time of startup due to heat capacity variations.

Now, the influence of heat capacity variations upon startup characteristics will be described with reference to FIG. 11.

If the second temperature control circuit (12) is not included, the increase of the temperature at the time of startup is not controlled. The temperature is changed in a parabolic manner and converged to a target temperature. However, because variations in the heat capacities cause variations in the transient, there is also a predetermined variation Δt' in a time required for the temperature to stabilize.

On the other hand, if the second temperature control circuit (12) is included, because a temperature increase at the time of startup is clamped at a predetermined temperature, the time needed for attaining a target temperature is shortened. Furthermore, since the temperature is directly clamped, variations in heat capacities do not affect a clamp temperature. Therefore, the variation Δt in startup time caused by heat capacity variations is smaller than the Δt'.

Next, advantages provided by the thermal flow sensor of the first embodiment will be described.

A first advantage is that since introducing the second temperature control circuit (12) can reduce the influence of variations in heat capacities due to a manufacturing error upon the time of startup characteristics, stable startup characteristics can be achieved. As a result, a step for adjusting individual differences is not needed. In addition, uniform startup characteristics can be ensured without increasing the size of the heater (6).

A second advantage is that since introducing the second temperature control circuit (12) can restrict an overshoot in temperature of the heater (6) at the time of startup, the startup time can be shortened. As a result, since the temperature of the heater (6) is more quickly stabilized, a waiting time before flow rate detection starts can be shortened. Alternatively, a longer time for self-diagnosis and the like can be ensured.

Figure 12:
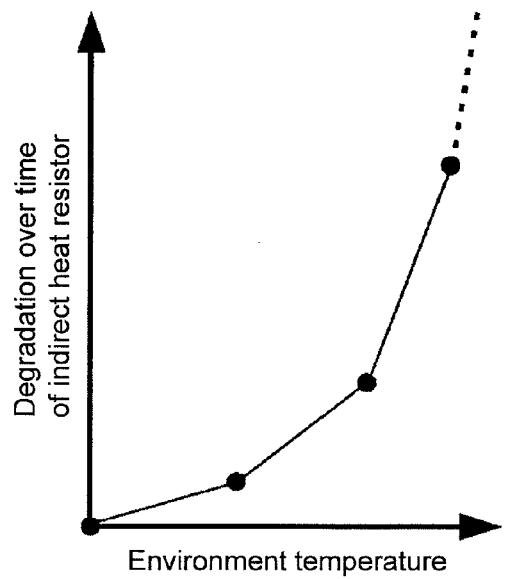
FIG. 12 illustrates environment temperature dependence of degradation over time of an indirect heat resistor.

A third advantage is that since introducing the second temperature control circuit (12) can prevent the temperature of the indirect heat resistor (7) from becoming higher than the second reference temperature, degradation caused by the heat of the indirect heat resistor (7) can be restricted. FIG. 12 illustrates environment temperature dependence of the degradation over time of the indirect heat resistor (7). According to FIG. 12, if the temperature is restricted, degradation can also be restricted. As a result, the temperature of the heater (6) can be controlled for a long while and detection accuracy can also be maintained for a long while.

A fourth advantage is that since introducing the second temperature control circuit (12) can prevent thermal runaway of the heater (6) as a fail-safe circuit that operates if the first temperature control circuit (11) fails. Thereby, the thermal flow sensor can safely transition to a fail-safe mode.

It should be noted that in the present embodiment, the switching element (16) has been placed on an energizing path between the transistor element (202) and the heater (6), but even if the switching element (16) is placed between the D/A converter (201) and the transistor element (202), the same advantages are provided. Also, the comparator (14) is not necessary, and even if an analog-to-digital converter (hereinafter, the A/D converter) is installed in place of the comparator (21) and the switching element (16) is operated on the basis of the output from the A/D converter, the same advantages are provided.

Second Embodiment

Figure 3:
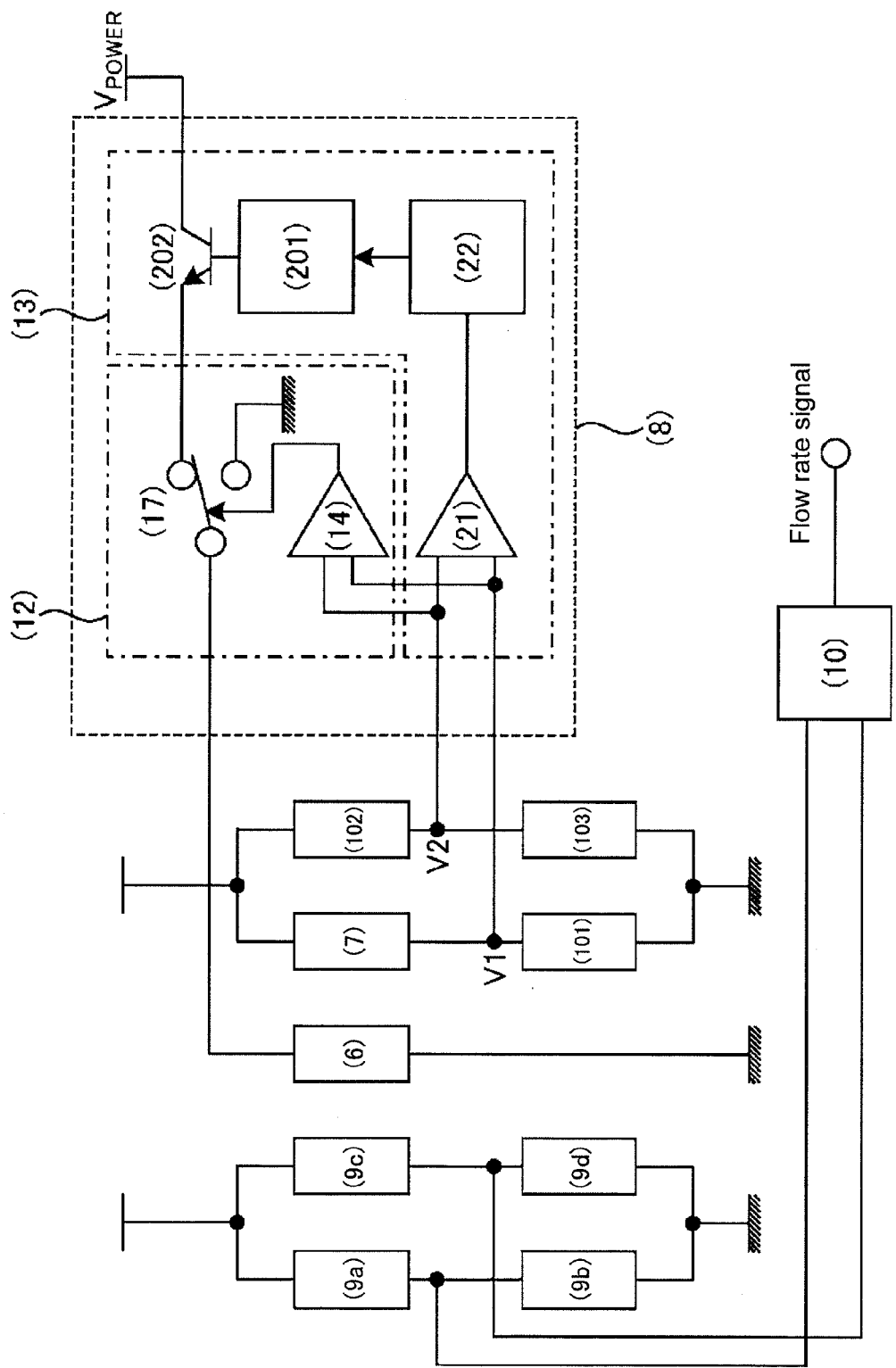
FIG. 3 illustrates a circuit configuration of a thermal flow sensor according to a second embodiment.

A second embodiment of the present invention will be described with reference to FIG. 3. FIG. 3 illustrates a circuit configuration of a thermal flow sensor according to the second embodiment.

The thermal flow sensor of the second embodiment is configured by providing a clamp element (17) in place of the switching element (16) of the first embodiment.

In the second embodiment, an operation in the steady state is equal to the operation in the first embodiment. However, an operation in the transient state is partially different. Specifically, when the comparator (14) outputs warning signals, the clamp element (17) disconnects the heater (6) from the transistor element (202) and clamps the heater (6) to a predetermined potential. Thereby, a constant voltage is applied to the heater (6). At this time, it is desirable that a potential for clamping the heater (6) be a ground potential or a potential equivalent thereto.

Next, advantages provided by the thermal flow sensor of the second embodiment will be described.

The advantages provided by the second embodiment include the advantages of the first embodiment as well as are that voltage at a heater end that occurs when the clamp element (17) is operated can be reliably reduced. Thereby, the temperature of the heater (6) can be more reliably lowered.

It should be noted that in the present embodiment, the clamp element (17) has been placed on an energizing path between the transistor element (202) and the heater (6), but even if the clamp element (17) is placed between the D/A converter (201) and the transistor element (202), the same advantages are provided. It is desirable that the clamp voltage in this case be an emitter potential of the transistor element (202), a ground potential, or a voltage equivalent thereto. In addition, even if the clamp element (17) is installed between the DSP (22) and the D/A converter (201), and a digital value output from the DSP (22) is clamped at a predetermined value, the same advantages are provided. Also, the comparator (14) is not necessary, and even if an analog-to-digital converter (hereinafter, the A/D converter) is installed in place of the comparator (21) and the clamp element (17) is operated on the basis of the output from the A/D converter, the same advantages are provided.

Third Embodiment

Figure 4:
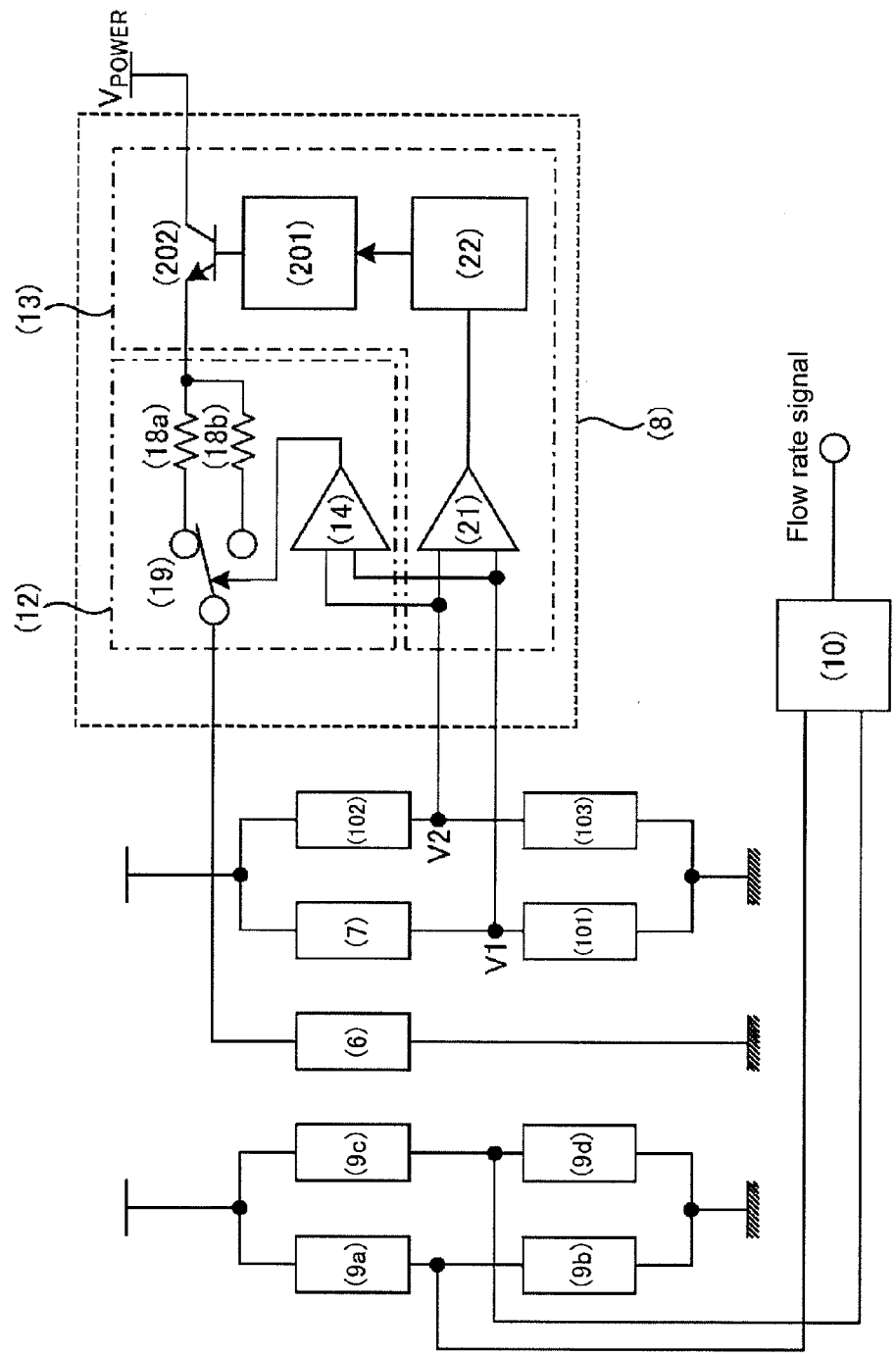
FIG. 4 illustrates a circuit configuration of a thermal flow sensor according to a third embodiment.

A third embodiment of the present invention will be described with reference to FIG. 4. FIG. 4 illustrates a circuit configuration of a thermal flow sensor according to the third embodiment.

The thermal flow sensor of the third embodiment is configured by providing, in place of the switching element (16) of the first embodiment, load resistors (18a) and (18b) having two resistance values and a resistor switch (19) for selecting any one of the resistors and connecting the selected one to the heater (6). It should be noted that in the present embodiment, it is assumed that the resistance value of the load resistor (18a) is lower than the value of (18b).

In the third embodiment, an operation in the steady state is equal to the operation in the first embodiment. However, it is assumed that in the steady state, a load resistor connected to the heater (6) is the resister (18a). Also, an operation in the transient state is partially different. Specifically, when the comparator (14) outputs warning signals, the resistor switch (19) switches the load resistor connected to the heater (6) from the resister (18a) to the resister (18b). Thereby, currents flowing through the heater (6) are reduced.

Next, advantages provided by the thermal flow sensor of the third embodiment will be described.

The advantages provided by the third embodiment include the advantages of the first embodiment as well as are that changes in driving current (Ih) that occur when the resistor switch (19) is operated can be reduced. According to the configuration of the sensor element illustrated in FIG. 1, since the heater (6), the indirect heat resistor (7), and the detection resistors (9a) to (9d) are provided in the thin layer area (5) and close to each other, cross-talk may occur. According to the embodiment, because noises caused by cross-talk on the sensor element can be reduced, the temperature of the heater (6) can be controlled and the detection resistor (9) can detect a flow rate with high accuracy.

It should be noted that in the embodiment, the load resistors (18a) and (18b) and the resistor switch (19) have been placed on an energizing path between the transistor element (202) and the heater (6), but even if they are placed between the D/A converter (201) and the transistor element (202), the same advantages are provided. Also, the comparator (14) is not necessary, and even if an analog-to-digital converter (hereinafter, the A/D converter) is installed in place of the comparator (21) and the resistor switch (19) is operated on the basis of the output from the A/D converter, the same advantages are provided. Also, the load resistors (18) are composed of variable resistors and the resistance values of the variable resistors are changed by the resistor switch (19), whereby the same advantages are provided. In addition, even if the load resistors (18) are connected in parallel with respect to the heater (6), the same advantages are provided.

Fourth Embodiment

Figure 5:
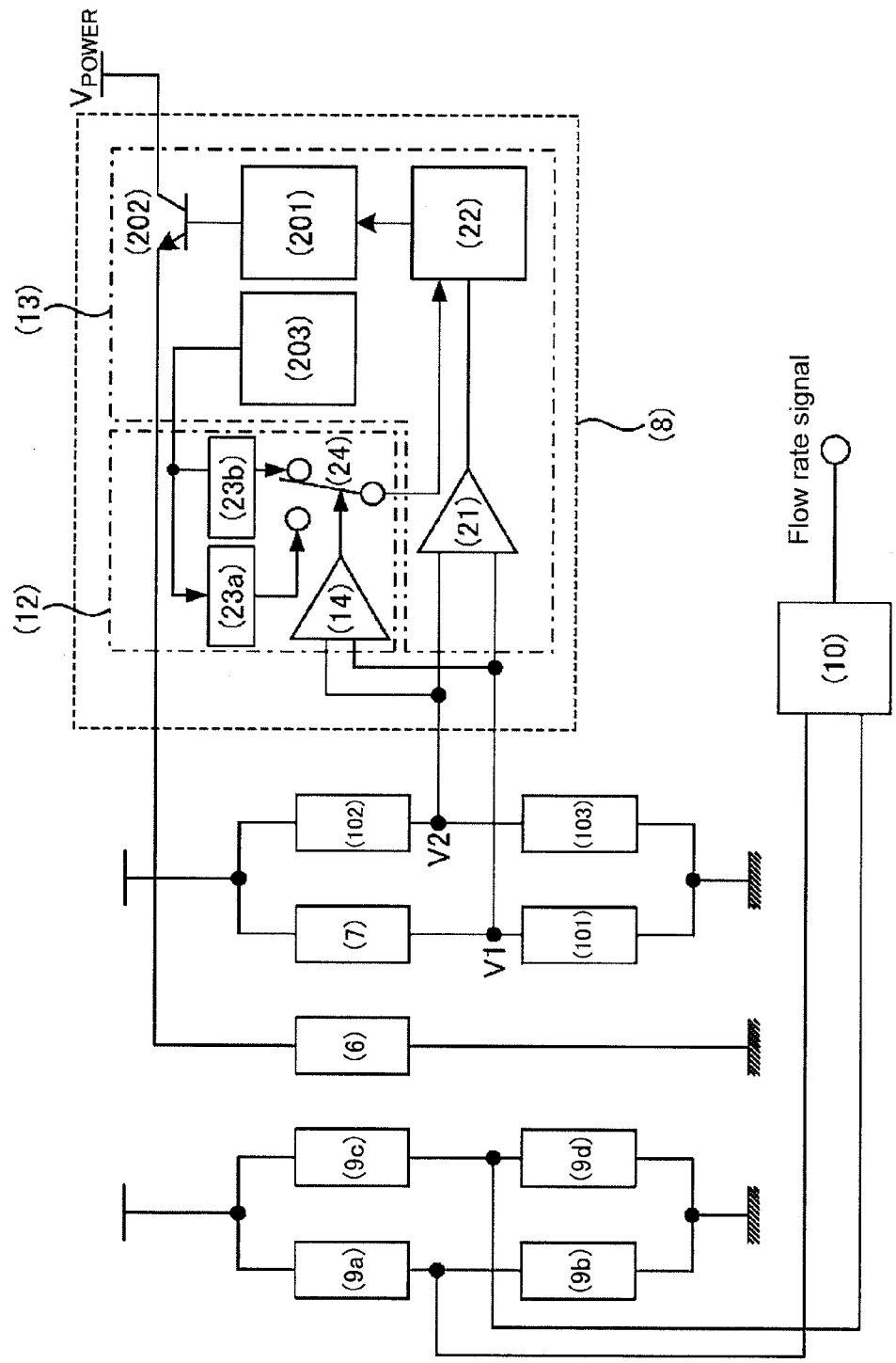
FIG. 5 illustrates a circuit configuration of a thermal flow sensor according to a fourth embodiment.

A fourth embodiment of the present invention will be described with reference to FIG. 5. FIG. 5 illustrates a circuit configuration of a thermal flow sensor according to the fourth embodiment.

The thermal flow sensor of the fourth embodiment is configured by providing, in place of the switching element (16) of the first embodiment, frequency dividers (23a) and (23b) that divide output from the reference oscillator (203) in different dividing ratios and a clock switch (24) that selects any one of first clock signals generated by the frequency divider (23a) and second clock signals generated by the frequency divider (23b) and slower than the first clock signals, as an operation clock of the DSP (22).

In the fourth embodiment, an operation in the steady state is equal to the operation in the first embodiment. However, in the steady state, the clock switch (24) selects the second clock signals. Also, an operation in the transient state is partially different. Specifically, when the comparator (14) outputs warning signals, the clock switch (24) switches an operation clock of the DSP (22) from the second clock signals to the first clock signals. Thereby, an operation speed of the DSP (22) becomes higher, and the DSP (22) quickly leaves the transient state and enters the steady state.

Next, advantages provided by the thermal flow sensor of the fourth embodiment will be described.

The advantages provided by the fourth embodiment include the advantages of the first embodiment as well as are that because the driving power of the heater (6) is not shut off or clamped, irregular current changes as illustrated in FIG. 10 do not occur and a change curve is smooth, so that cross-talk can be reliably restricted. Thereby, the temperature of the heater (6) can be controlled and the detection resistor (9) can detect a flow rate with high accuracy.

It should be noted that applications of the present embodiment are as follows. Even if a second reference oscillator that generates a clock having a period different from the reference oscillator is newly installed, the same advantages are provided. Also, the comparator (14) is not necessary, and even if an analog-to-digital converter (hereinafter, the A/D converter) is installed in place of the comparator (21) and the clock switch (24) is switched on the basis of the output from the A/D converter, the same advantages are provided. In addition, even if a dividing ratio of the frequency dividers (23) is variable and changed in response to the output from the comparator (14), the same advantages are provided.

Fifth Embodiment

Figure 6:
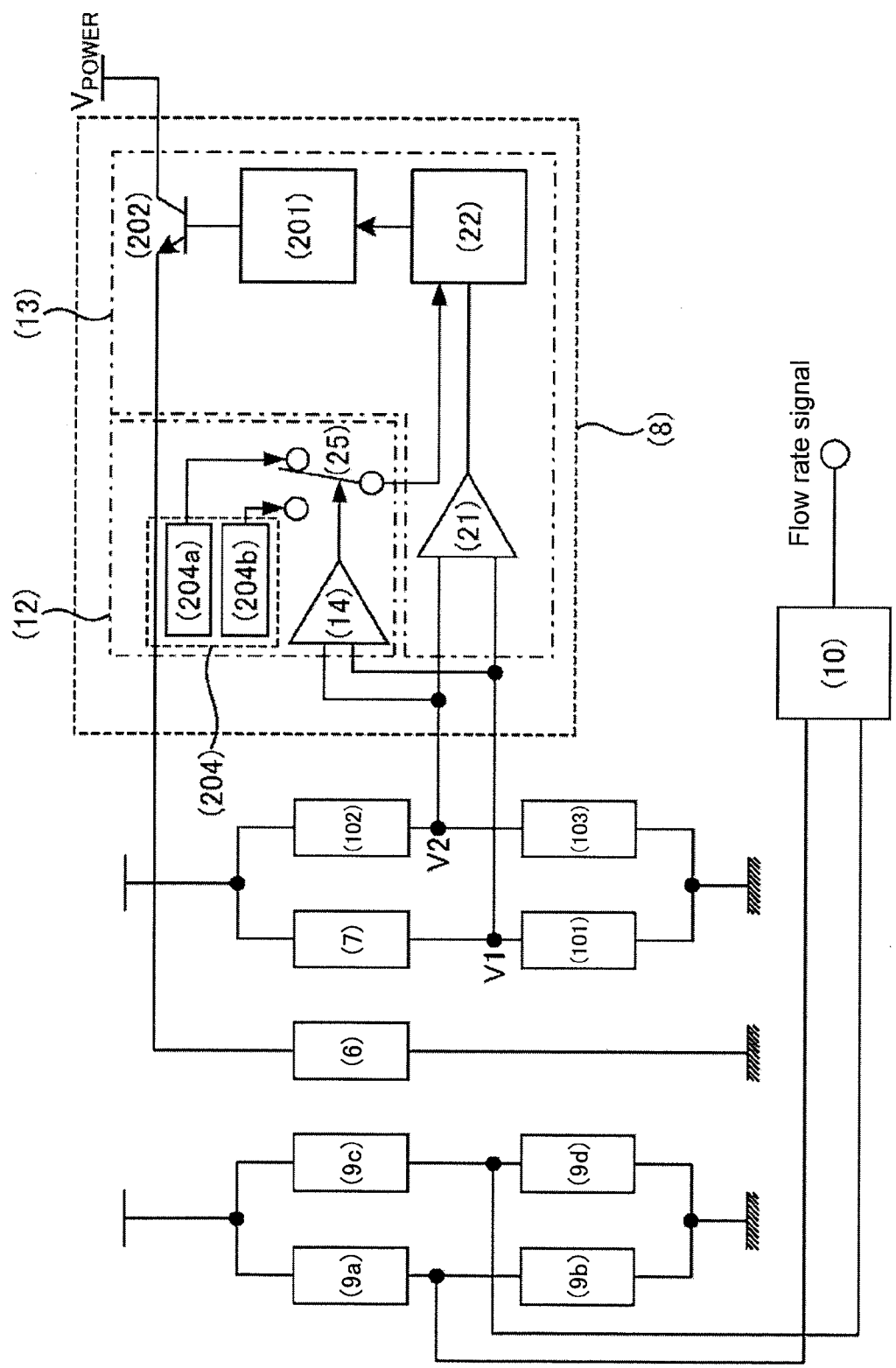
FIG. 6 illustrates a circuit configuration of a thermal flow sensor according to a fifth embodiment.

A fifth embodiment of the present invention will be described with reference to FIG. 6. FIG. 6 illustrates a circuit configuration of a thermal flow sensor according to the fifth embodiment.

The thermal flow sensor of the fifth embodiment is configured by providing, in place of the frequency dividers (23) of the fourth embodiment, a memory element (204) and a constant selecting switch (25) that selects one of two different storage values (204a) and (204b) stored in the memory element (204), as arithmetic constants of the DSP (22). In the present embodiment, it is assumed that an absolute value of the storage value (204a) is lower than an absolute value of the storage value (204b).

Figure 13:
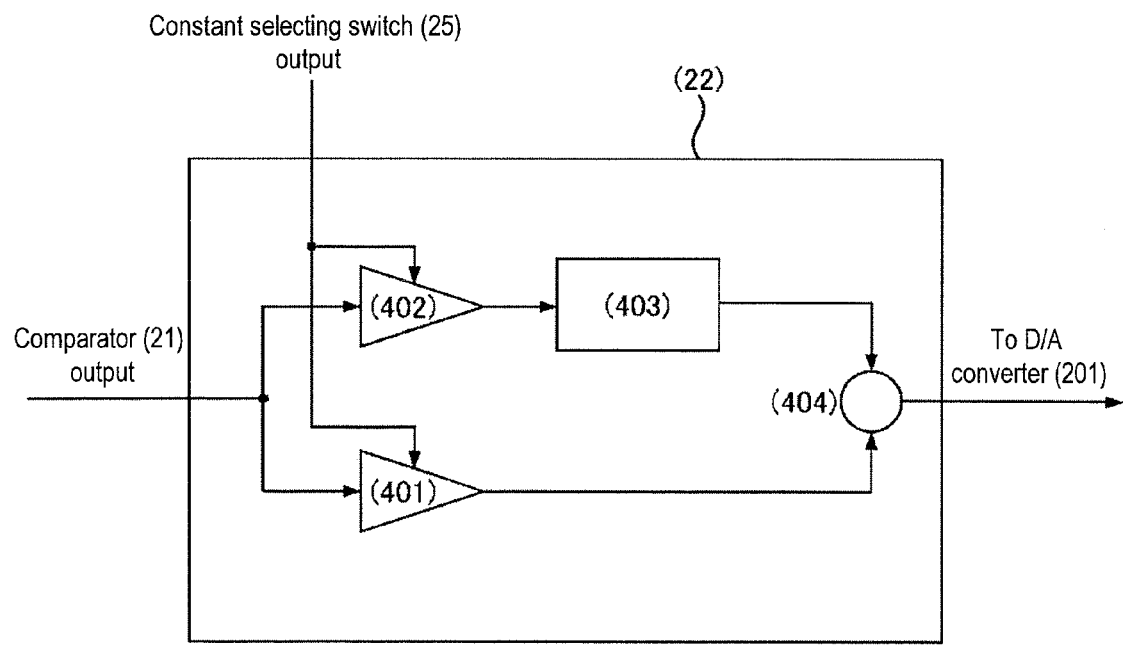
FIG. 13 illustrates a block diagram of exemplary processing of a DSP.

In addition, an internal configuration of the DSP (22) will be described with reference to FIG. 13. FIG. 13 illustrates a block diagram of exemplary processing of the DSP (22).

The DSP (22) includes, for example, a proportional gain (401), an integrator gain (402), an integrator (403), and an adder (404) that adds outputs of the proportional gain (401) and the integrator (403) together.

In the fifth embodiment, an operation in the steady state is equal to the operation in the first embodiment. However, in the steady state, as illustrated in FIG. 6, the constant selecting switch (25) selects the storage value (204a). Also, an operation in the transient state is partially different. Specifically, when the comparator (14) outputs warning signals, the constant selecting switch (25) switches from the storage value (204a) to the storage value (204b) to change input/output gain of the DSP (22). Thereby, values set to the proportional gain (401) and the integrator gain (402) of the DSP (22) are changed and the input/output gain of the DSP (22) increases. That is, a feedback gain is increased and accordingly responsiveness of a heater control system is improved, so that the DSP (22) quickly leaves the transient state and enters the steady state.

Next, advantages provided by the thermal flow sensor of the fifth embodiment will be described.

The advantages provided by the fifth embodiment include the advantages of the first embodiment as well as are that because the driving power of the heater (6) is not shut off or clamped, irregular current changes as illustrated in FIG. 10 do not occur and a change curve is smooth, so that cross-talk can be reliably restricted. Thereby, the temperature of the heater (6) can be controlled and the detection resistor (9) can detect a flow rate with high accuracy. Furthermore, in hardware, because a component required to be added is only the memory element (204), a simple configuration may provide the advantages.

It should be noted that applications of the present embodiment are as follows. In addition to the proportional gain (401) and the integrator gain (402), a gain for adjustment may also be installed. Specifically, input from the comparator (21) is amplified and then input to each gain, or a gain may be installed at a site subsequent to the adder (404). Also, the same advantages can be provided by changing the gain of the D/A converter (201), namely, a dynamic range.

Sixth Embodiment

Figure 7:
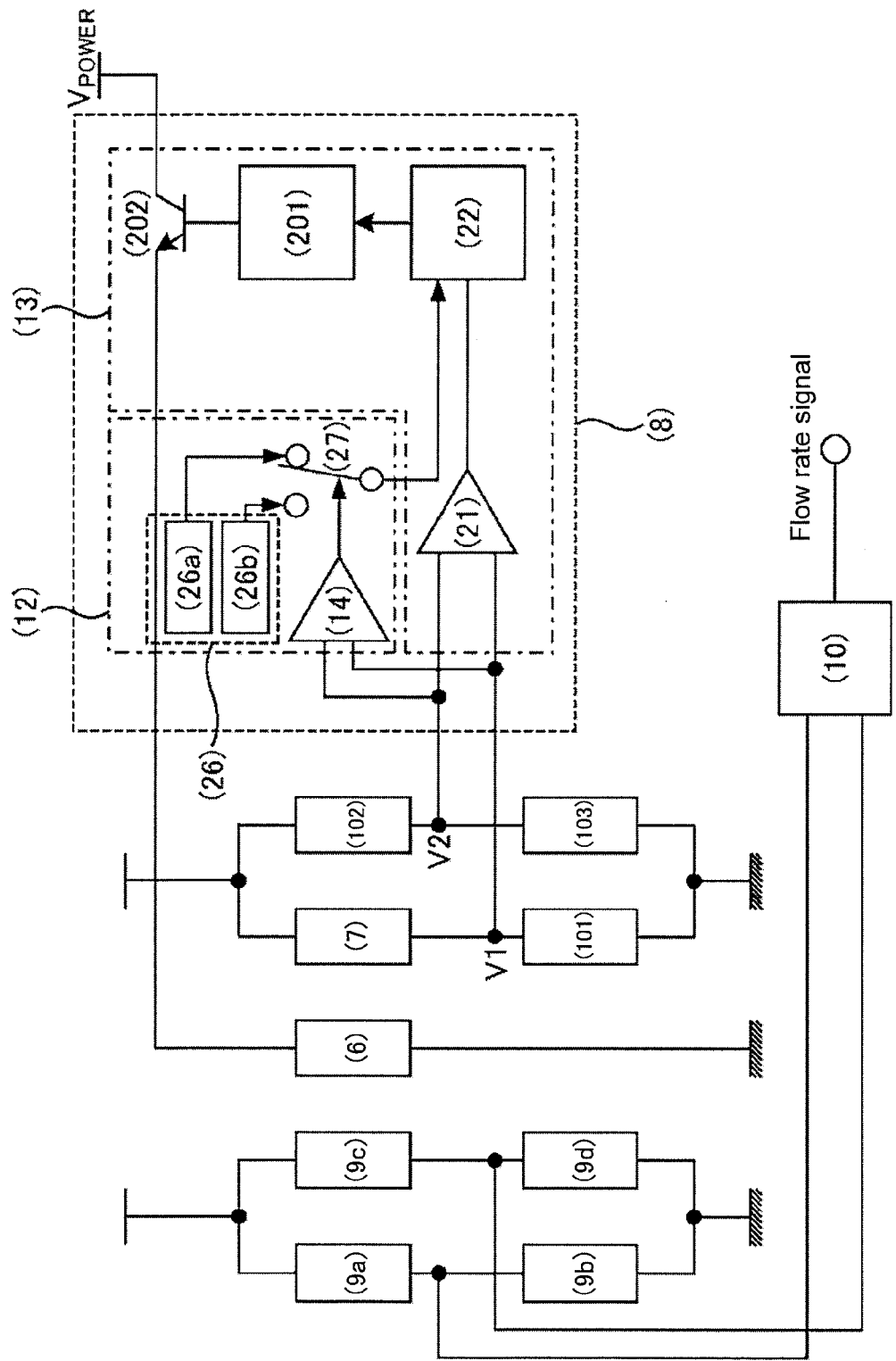
FIG. 7 illustrates a circuit configuration of a thermal flow sensor according to a sixth embodiment.

A sixth embodiment of the present invention will be described with reference to FIG. 7. FIG. 7 illustrates a circuit configuration of a thermal flow sensor according to the sixth embodiment.

The thermal flow sensor of the sixth embodiment is configured by providing, in place of the frequency dividers (23) of the fifth embodiment, a memory element (26) and a program selecting switch (27) that selects one of two different processing programs (26a) and (26b) stored in the memory element (26), as processing programs of the DSP (22). In the present embodiment, it is assumed that a capacity of the processing program (26a) is greater than a capacity of the processing program (26b).

In the sixth embodiment, an operation in the steady state is equal to the operation in the first embodiment. However, in the steady state, the program selecting switch (27) selects the processing program (26a). Also, an operation in the transient state is partially different. Specifically, when the comparator (14) outputs warning signals, the program selecting switch (27) changes a processing program of the DSP (22) into the shorter processing program (26b). Thereby, an operation period of the DSP (22) is substantially shortened and accordingly responsiveness of a heater control system is improved, so that the DSP (22) quickly leaves the transient state and enters the steady state.

Next, advantages provided by the thermal flow sensor of the sixth embodiment will be described.

The advantages provided by the sixth embodiment include the advantages of the first embodiment as well as are that because the driving power of the heater (6) is not shut off or clamped, irregular current changes as illustrated in FIG. 10 do not occur and a change curve is smooth, so that cross-talk can be reliably restricted. Thereby, the temperature of the heater (6) can be controlled and the detection resistor (9) can detect a flow rate with high accuracy. Furthermore, in hardware, because a component required to be added is only the memory element (26), a simple configuration may provide the advantages.

What is claimed is:

1. A thermal flow sensor comprising:
a semiconductor substrate;
a cavity portion provided in the semiconductor substrate;
a dielectric film provided on the semiconductor substrate so as to cover the cavity portion;
a thin layer area formed as a result of the dielectric film covering the cavity portion;
a heating resistor provided in the thin layer area on the dielectric film;
a first temperature-sensitive resistor provided in the thin layer area on the dielectric film, a resistance value of the first temperature-sensitive resistor varying depending upon temperature;
a heating controller that controls temperature of the heating resistor on the basis of temperature of the first temperature-sensitive resistor;

a second temperature-sensitive resistor provided near the heating resistor, a resistance value of the second temperature-sensitive resistor varying depending upon temperature; and a flow rate detector that detects a flow rate of a fluid on the basis of temperature of the second temperature-sensitive resistor, wherein the heating controller controls the temperature of the heating resistor on the basis of a first reference temperature, which is a target temperature of the first temperature-sensitive resistor, and a second reference temperature, which is an escape temperature of the first temperature-sensitive resistor.

2. The thermal flow sensor according to claim 1, wherein the second reference temperature is set at a temperature higher than the first reference temperature, and the heating controller comprises:

a first temperature controller that brings a temperature of the first temperature-sensitive resistor close to the first reference temperature; and a second temperature controller that holds temperature of the first temperature-sensitive resistor at a temperature equal to or lower than the second reference temperature.

3. The thermal flow sensor according to claim 2, wherein the first temperature controller comprises a feedback controller that receives signals based on the temperature of the first temperature-sensitive resistor and outputs either power to be supplied to the heating resistor or a power indication value.

4. The thermal flow sensor according to claim 2, wherein the second temperature controller comprises a determining unit that receives signals based on the temperature of the first temperature-sensitive resistor and determines whether or not the temperature of the first temperature-sensitive resistor is equal to or greater than the second reference temperature.

5. The thermal flow sensor according to claim 2, wherein the second temperature controller comprises a limit unit that limits either power to be supplied to the heating resistor or a power indication value on the basis of a temperature difference between a temperature of the first temperature-sensitive resistor and the second reference temperature.

6. The thermal flow sensor according to claim 5, wherein the limit unit comprises a disconnecting unit that disconnects a transmission path for the power or the power indication value.

7. The thermal flow sensor according to claim 5, wherein the limit unit comprises a fixing unit that fixes the power or the power indication value to a predetermined value.

8. The thermal flow sensor according to claim 5, wherein the limit unit comprises load resistors electrically connectable to the heating resistor and having at least two resistance values and a connection unit that provides electrical connection to the heating resistor by selecting one of the resistance values of the load resistors.

9. The thermal flow sensor according to claim 3, wherein the second temperature controller comprises an accelerator that accelerates an input/output response of the feedback controller on the basis of a temperature difference between the temperature of the first temperature-sensitive resistor and the second reference temperature.

10. The thermal flow sensor according to claim 9, wherein the feedback controller comprises a digital converter that converts signals based on the temperature of the first temperature-sensitive resistor into digital signals and a digital signal processor that performs processing on the basis of a first clock signal;

the accelerator comprises a second clock generating unit that generates a second clock signal having a period different from a period of the first clock signal and a clock switch that switches between clock signals for operating the digital signal processor; and the clock switch switches between operation clocks of the digital signal processor on the basis of a difference between the temperature of the first temperature-sensitive resistor and the second reference temperature.

11. The thermal flow sensor according to claim 9, wherein the feedback controller comprises a digital converter that converts signals based on the temperature of the first temperature-sensitive resistor into digital signals and a digital signal processor that performs processing on the basis of the digital signals, and the accelerator comprises a gain changing unit that changes an input/output gain of the digital signal processor and that maximizes the input/output gain of the digital signal processor on the basis of a difference between the temperature of the first temperature-sensitive resistor and the second reference temperature.

12. The thermal flow sensor according to claim 9, wherein the feedback controller comprises a digital converter that converts signals based on temperature of the first temperature-sensitive resistor into digital signals, a digital signal processor that performs processing on the basis of the digital signals, and storage in which at least two different processing programs are stored;

the accelerator comprises a program selecting unit that selects a process of the digital signal processor; and the program selecting unit changes a process of the digital signal processor on the basis of a difference between the temperature of the first temperature-sensitive resistor and the second reference temperature.

* * * * *